United States Patent
Coldwate et al.

(10) Patent No.: US 9,124,158 B2
(45) Date of Patent: Sep. 1, 2015

(54) PHASE SEPARATOR INSULATOR FOR ELECTRIC MACHINE STATOR

(71) Applicant: Hamilton Sundstrand Corporation, Windsor Locks, CT (US)

(72) Inventors: Joseph Kenneth Coldwate, Roscoe, IL (US); Wilfredo E. Colon Velazquez, South Beloit, IL (US); Gordon W. Friske, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 298 days.

(21) Appl. No.: 13/724,809

(22) Filed: Dec. 21, 2012

(65) Prior Publication Data
US 2014/0175936 A1    Jun. 26, 2014

(51) Int. Cl.
*H02K 3/34* (2006.01)
*H02K 3/30* (2006.01)
*H02K 3/38* (2006.01)
*H02K 15/085* (2006.01)

(52) U.S. Cl.
CPC .. *H02K 3/30* (2013.01); *H02K 3/38* (2013.01); *H02K 15/085* (2013.01); *Y10T 29/49009* (2015.01)

(58) Field of Classification Search
CPC ....................................................... H02K 3/30
USPC ...................................... 310/215, 179; 29/596
See application file for complete search history.

(56) References Cited

U.S. PATENT DOCUMENTS

| | | | |
|---|---|---|---|
| 3,439,205 A * | 4/1969 | Houtman | 310/180 |
| 3,909,648 A * | 9/1975 | Clark | 310/260 |
| 4,160,316 A | 7/1979 | Kindig | |
| 4,403,162 A * | 9/1983 | Pallaro | 310/194 |
| 4,455,743 A * | 6/1984 | Witwer et al. | 29/596 |
| 4,829,649 A * | 5/1989 | Tribot | 29/596 |
| 5,093,543 A | 3/1992 | Patton et al. | |
| 7,560,850 B2 | 7/2009 | Uetsuji et al. | |
| 7,649,296 B2 | 1/2010 | Fukasaku et al. | |
| 8,264,116 B2 | 9/2012 | Zahora et al. | |
| 2010/0013349 A1* | 1/2010 | Breden et al. | 310/260 |
| 2012/0235534 A1 | 9/2012 | Chamberlin | |

* cited by examiner

*Primary Examiner* — Hanh Nguyen
(74) *Attorney, Agent, or Firm* — Kinney & Lange, P.A.

(57) ABSTRACT

An insulating phase separator is used in an electric machine to separate phase windings in a stator assembly. The insulating phase separator includes first and second endturn portions and first and second leg portions. The first and second endturn portions each have a curved outer surface and a tabbed portion located opposite the curved outer surface. The first and second leg portions extend between the first and second endturn portions and are integral with the first and second endturn portions.

11 Claims, 4 Drawing Sheets

PHASE SEPARATOR INSULATOR FOR ELECTRIC MACHINE STATOR

BACKGROUND

The present invention is related to electric machines and in particular to stator assemblies of electric machines.

Electric machines typically include a rotating portion called a rotor and a stationary portion called a stator that includes a plurality of windings. In an electric motor, the stator windings receive electrical energy that generates a rotating magnetic field, which interacts with the rotor to generate mechanical energy. In an electric generator, mechanical energy supplied to a rotor causes a magnetic field (generated by the rotor) to rotate and interact with the stator windings to generate electric energy. The stator typically includes a plurality of phase windings (e.g., three-phase) for either receiving a three-phase AC input voltage in motoring application or for providing a three-phase AC output in generating applications. To prevent shorts between the plurality of phase windings, insulating material is placed between adjacent phase windings.

SUMMARY

An insulating phase separator is used in an electric machine to separate phase windings in a stator assembly. The insulating phase separator includes first and second endturn portions and first and second leg portions. The first and second endturn portions each have a curved outer surface and a tabbed portion located opposite the curved outer surface. The first and second leg portions extend between the first and second endturn portions and are integral with the first and second endturn portions.

DETAILED DESCRIPTION

Figures 1A, 1B:
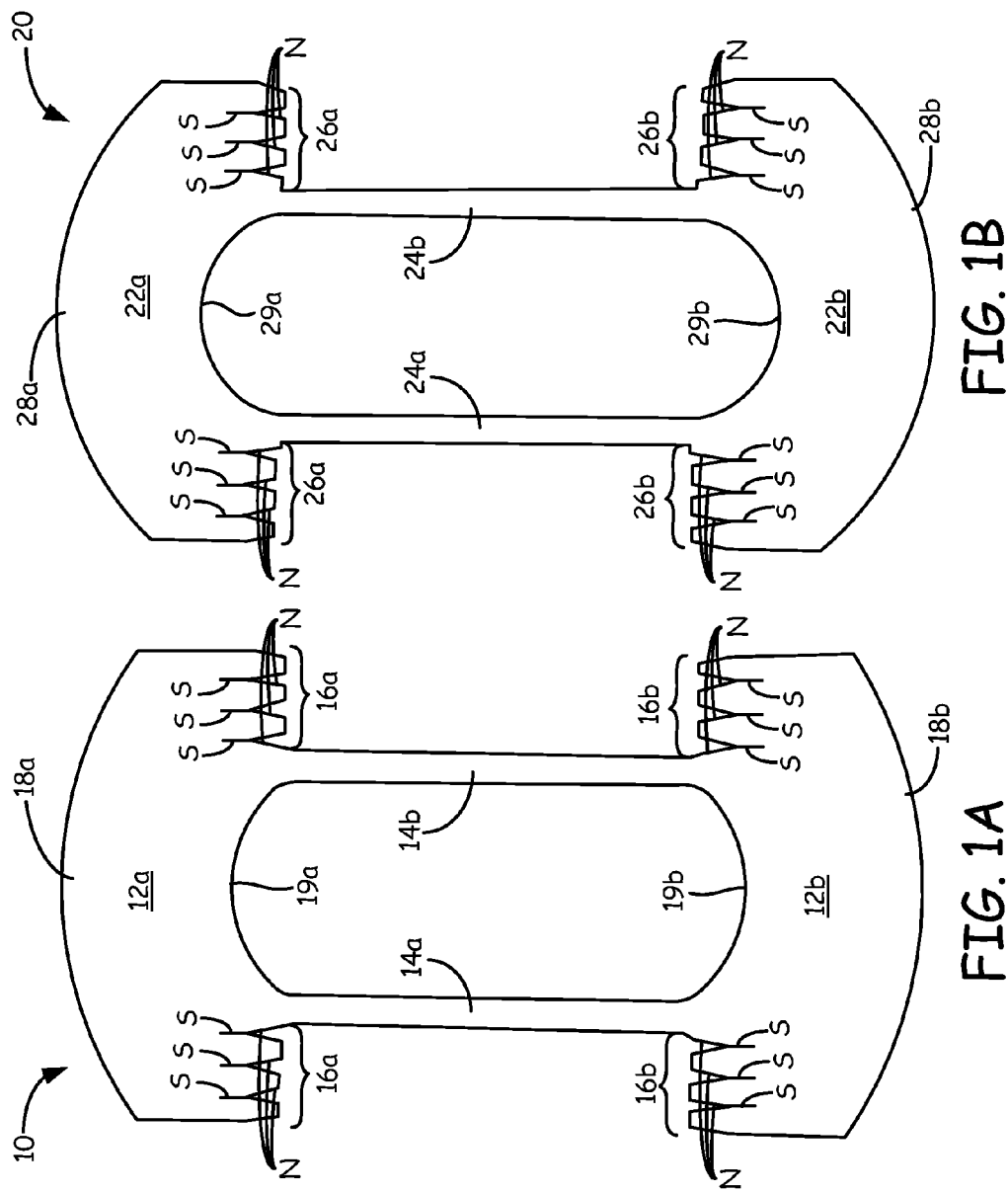
FIGS. 1A and 1B are top views of phase separators according to an embodiment of the present invention.

FIGS. 1A and 1B are top views of phase separators 10 and 20, respectively, according to an embodiment of the present invention. Phase separator 10 includes endturn portions 12a and 12b, leg portions 14a and 14b, and tab portions 16a and 16b formed in endturn portions 12a and 12b. Similarly, phase separator 20 includes endturn portions 22a and 22b, leg portions 24a and 24b, and tab portions 26a and 26b. The size and/or geometry of the phase separators 10 and 20 are slightly different to account for differences in radial placement of each phase separator. For example, phase separator 10 is placed radially outward of phase separator 20, and therefore is slightly larger than phase separator 20.

Phase separators 10 and 20 are constructed of an insulating material that prevents electrical conduction between each of the phase windings. In addition, phase separators 10 and 20 are unitary in construction. For example, endturn portion 12a is connected to endturn portion 12b via leg portions 14a and 14b. Similarly, endturn portion 22a is connected to endturn portion 22b via leg portions 24a and 24b. A benefit of unitary construction of phase separators 10 and 20, as opposed to endturn portions and leg portions that are separate, is the unitary construction maintains the position of the phase insulator in a desired location without requiring an installer to maintain position of each component individually until windings have been installed and bound with lacing cord.

Endturn portions 12a and 12b include an outer surface 18a and 18b, respectively, and inner surface 19a and 19b, respectively. Similarly, endturn portions 22a and 22b include an outer surface 28a and 28b, respectively, and inner surface 29a and 29b, respectively. Outer surfaces 18a, 18b, 28a, and 28b are curved to provide a phase separator geometry that corresponds with the geometry of the phase winding endturns (not shown). Similarly, inner surfaces 19a, 19b, 29a, and 29b are curved to provide a phase separator geometry that corresponds with the geometry of the phase winding endturns (not shown). In the embodiment shown in FIGS. 1A and 1B, the geometry of outer surfaces 18a and 18b are different than the geometry of outer surfaces 28a and 28b to accommodate the difference in radial position of phase separators 10 and 20. Similarly, the geometry of inner surfaces 19a and 19b are different than the geometry of inner surfaces 29a and 29b.

Figure 2:
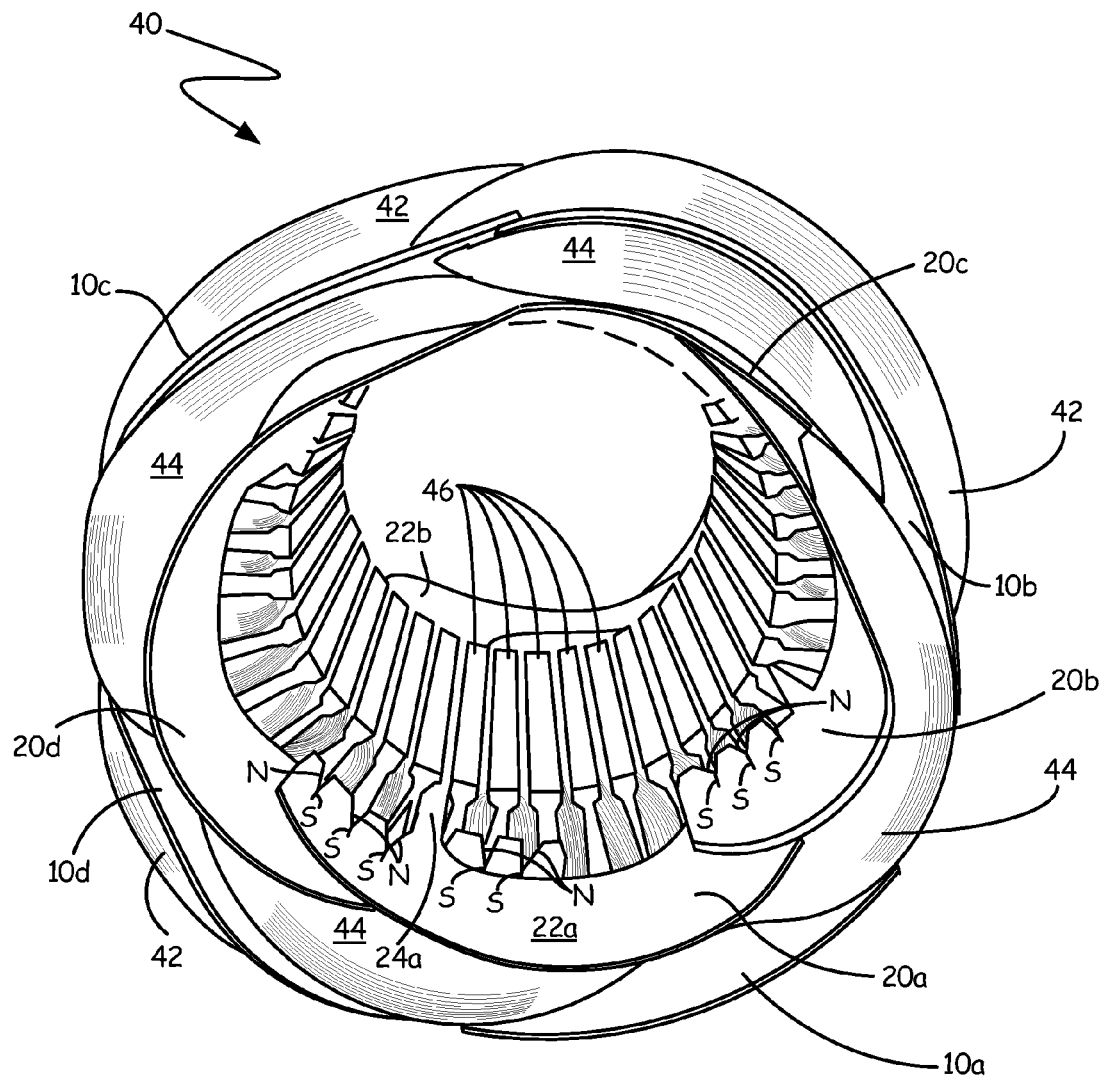
FIG. 2 is an end view of a stator assembly that illustrates the location of phase separators between phase windings.

Leg portions 14a and 14b are sized to accommodate placement of leg portions 14a and 14b within the stator slots (shown in FIG. 2). Similarly, leg portions 24a and 24b are sized to accommodate fitting leg portions 24a and 24b within the stator slots (shown in FIG. 2). In the embodiment shown in FIGS. 1A and 1B, the width of leg portions 14a, 14b, 24a and 24b are equal to one another. Leg portions 14a, 14b, 24a and 24b provide insulation between windings wound in the same stator slot.

Tab portions 16a and 16b are formed on a side opposite outer surfaces 18a and 18b of endturn portions 12a and 12b, respectively, and outside of leg portions 14a and 14b. Similarly, tab portions 26a and 26b are formed on a side opposite outer surfaces 28a and 28b (i.e., an inner surface) of endturn portions 22a and 22b, and outside of leg portions 24a and 24b. The geometry of tab portions 16a and 16b includes notches (N) located between each tab in tab portions 16a and 16b. As opposed to traditional triangular notches that result in jagged tab portions, the slot shaped notches in the embodiment shown in FIGS. 1A and 1B are narrow at both ends such that tab portions 16a and 16b have a substantially flat portion between each notch. Tab portions 26a and 26b have a similar geometry, allowing a substantially flat portion between each notch. Notches N formed between each tab in tab portions 16a and 16b (and 26a and 26b) is configured to receive a lace or cord that is used to bind the endturns of the plurality of phase coils. Notches N provide an easy guide for a manufacturer to use in placing the cord. In addition, notches N allow the cord to be pulled tight without crimping or moving tab portions 16a, 16b, 26a and 26b. Additionally, located at the apex of the notches (N), slits (S) can be incorporated within the insulator of which is used to receive the lacing cord to maintain insulator in the desired position. The generally triangular shape of the notches (N) help to guide the cord into these slits (S).

FIG. 2 is an end view of stator assembly 40 that illustrates the location of phase separators 10 and 20 adjacent to phase windings 42 and 44. Stator assembly 40 includes a plurality of stator teeth 46 that extend radially inward from a stator core (not shown). The plurality of stator teeth 46 define a plurality of stator slots (not numbered) for receiving phase windings 42 and 44. In the embodiment shown in FIG. 2, two phase windings 42 and 44 have been wound around stator assembly 40. A third phase winding (not shown) will be subsequently wound around stator assembly 40. Because phase winding 42 is the first winding wound around stator assembly 40, it is located radially outward of all subsequently wound phase windings including phase winding 44.

Subsequent to the winding of phase winding 42 around stator assembly 40, phase separators 10a, 10b, 10c, and 10d (collectively, phase separators 10) are placed adjacent to phase winding 42. Leg portions 14a and 14b of each phase separator 10 are placed within the slots defined by stator teeth 46 and utilized by phase winding 42. In the embodiment shown in FIG. 2, a plurality of phase separators 10a, 10b, 10c, and 10d are required to accommodate the winding of phase winding 42 circumferentially around stator assembly 40.

Subsequent to the placement of phase separator 10, phase winding 44 is wound around stator assembly 40. Phase winding 44 is therefore located radially inward of both phase winding 42 and phase separators 10a, 10b, 10c, and 10d, with phase separators 10a, 10b, 10c, and 10d located between phase winding 42 and phase winding 44 to provide electrical isolation between phase winding 42 and phase winding 44. Subsequent to the winding of phase winding 44 around stator assembly 40, phase separators 20a, 20b, 20c, and 20d are placed adjacent to phase winding 44. Phase separator 20a is most readily visible in FIG. 2, wherein endturn portion 22a is shown in the near-field and endturn portion 22b is shown in the far-field. Leg portion 24a is illustrated extending within a slot defined between adjacent teeth 46 and utilized by phase winding 44. Leg portion 24b (not visible in this view) would similarly extend within a slot defined between adjacent teeth 46 utilized by phase winding 44. Once again, a plurality of phase separators 20a, 20b, 20c, and 20d are required to accommodate the winding of phase winding 44 circumferentially around stator assembly 40. Subsequent to placement of phase separators 20a, 20b, 20c, and 20c, a third phase winding (not shown) would be wound around stator winding 40, with phase separators 20a, 20, 20c, and 20d providing insulation between second phase winding 44 and the third phase winding (not shown).

As discussed above, because phase separators 20 are located radially inward of phase separator 10, the geometry requirements of phase separators 10 and phase separators 20 are slightly different. In particular, phase separator 10 is typically slightly wider than phase separator 20 due to phase separator 20 being radially interior of phase separator 10. Additionally, the phase separator 20 may be slightly taller than phase separator 10 because phases installed closer to the interior generally have slightly taller endturns with the use of preformed coils.

Figure 3:
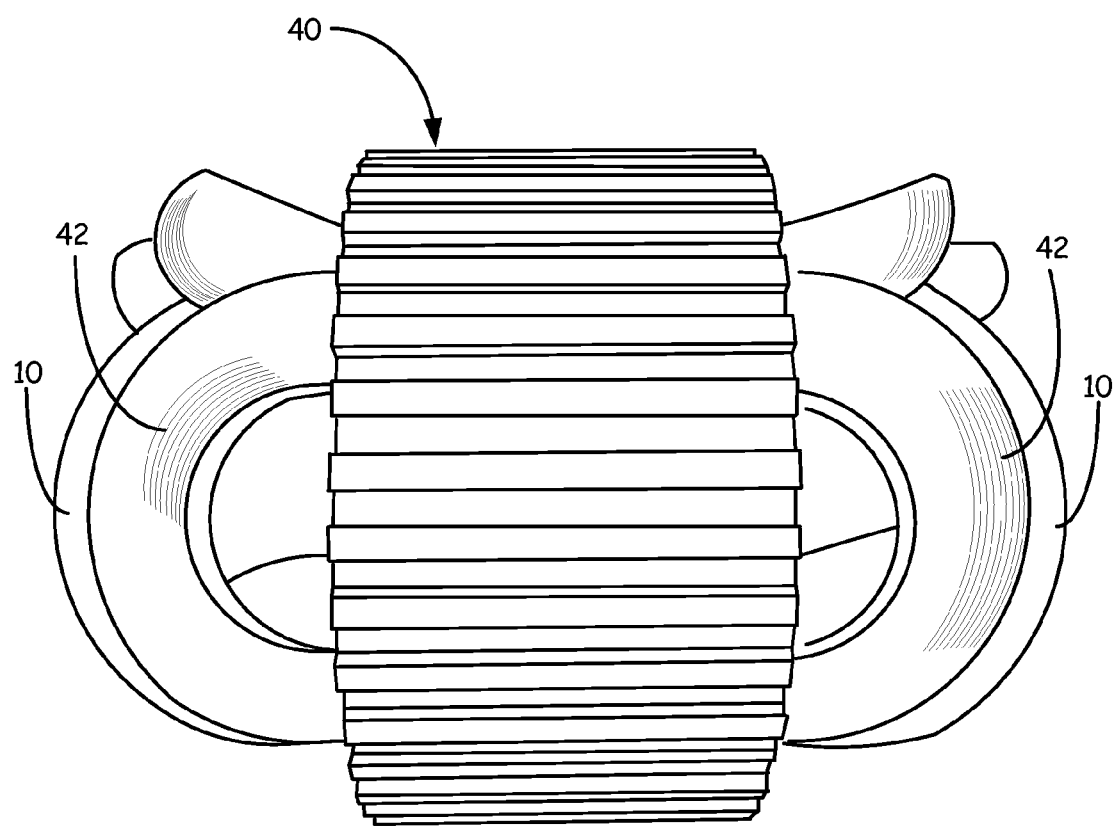
FIG. 3 is a side view of a stator assembly that illustrates the geometry of end turn portions of phase separators.

FIG. 3 is a side view of stator assembly 40 that illustrates the geometry of end turn portions of phase separator 10. In the embodiment shown in FIG. 3, phase winding 42 and phase separator 10 are visible, with phase separator 10 located radially inward or interior of phase winding 42. Phase separator 20 is located radially inward of both phase separator 10 and phase winding 42, and is therefore not visible in this view. The embodiment shown in FIG. 3 illustrates how the curved geometry of end portions 12a and 12b are aligned with the geometry of the endturn portions of phase winding 42. Aligning the geometry between phase separator 10 and phase winding 42 improves how well stator assembly can be bound with lacing cords.

Figure 4:
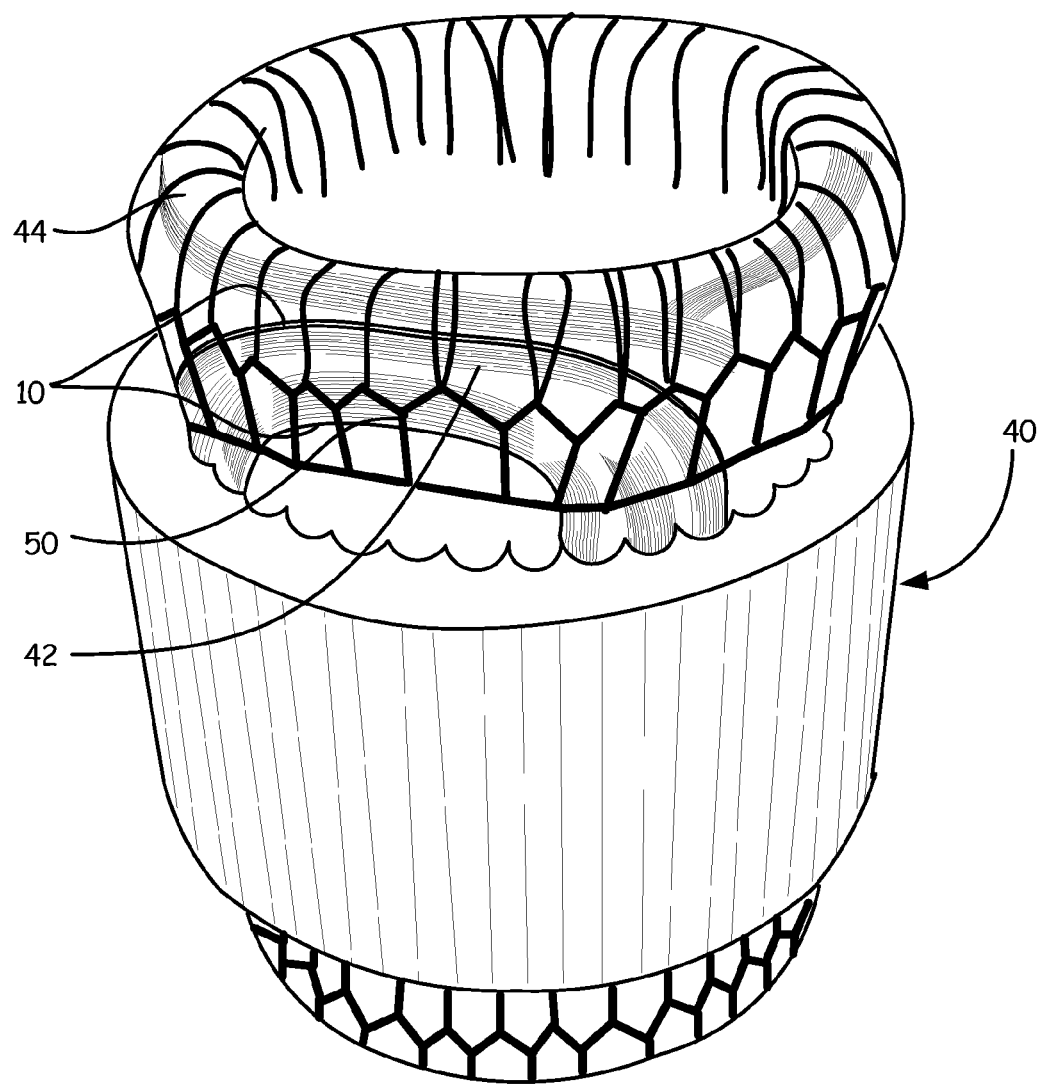
FIG. 4 is a perspective view of a stator assembly with lacing cord wrapped around winding endturns.

FIG. 4 is a perspective view of stator assembly 40 with lacing cord 50 wrapped around winding endturns. Because each of the phase windings are offset circumferentially from one another, lacing cord may be run through the tabbed portion 16a, 16b (not visible in this view) of separator 10 as well as in the space created between leg portions 14a and 14b (also not visible in this view) of phase separator 10. Similarly, lacing cord may be run through tabbed portion 26a, 26b (not visible in this view) of separator 20 as well as in the space created between leg portions 24a and 24b (not visible in this view) of phase separator 20. Leg portions 14a, 14b, and 24a, 24b tend to maintain the lacing cord in the desired position. However, in the space outside of leg portions 14a, 14b, and 24a, 24b, it is beneficial to have tab portions 16a, 16b, and 26a, 26b, respectively, to maintain lacing cord 50 in the desired position.

Discussion of Possible Embodiments

The following are non-exclusive descriptions of possible embodiments of the present invention.

An insulating phase separator is employed in a stator assembly of an electric machine to separate phase windings wrapped around the stator assembly. The insulating phase separator comprises first and second endturn portions, each having a curved outer surface and a tabbed portion located opposite the curved outer surface, and first and second leg portions that extend between the first and second endturn portions and are integral with the first and second endturn portions.

The insulating phase separator of the preceding paragraph can optionally include, additionally and/or alternatively, any one or more of the following features, configurations and/or additional components. For example, the curved outer surface of the first and second endturn portions may be selected based on a geometry of the phase winding endturns located adjacent to the first and second endturn portions.

The tabbed portion located opposite the curved outer surface may further be defined by a plurality of notches and adjoining slits located between each tab for receiving lacing cord.

The first and second endturn portions may further include a curved inner surface located between the first and second leg portions, wherein the geometry of the curved inner surface is selected based on the geometry of the phase winding endturns located adjacent to the first and second endturn portions.

A stator assembly for an electric machine includes a stator core, a first phase winding, a first phase separator, and a second winding. The stator core has a plurality of stator teeth extending radially inward from the stator core, the plurality of stator teeth defining a plurality of stator slots for receiving phase windings. The first phase winding has windings located in a first plurality of the stator slots and having endturn portions extending beyond the stator core. The first phase separator located adjacent the first phase winding has first and second endturn portions and first and second leg portions integrally formed with and connecting the first endturn portion with the second endturn portion. The first and second leg portions fit within the stator slots and the first and second endturn portions each have inner and outer surfaces that are curved to match a geometry of the endturn portions of the first phase winding. The second phase winding has windings located in a second plurality of stator slots and has endturn portions extending beyond the stator core, wherein the first phase separator electrically insulates the first phase winding form the second phase winding.

The stator assembly of the preceding paragraph can optionally include, additionally and/or alternatively, any one or more of the following features, configurations and/or additional components. For example, the stator assembly may further include a second phase separator located adjacent the second phase winding. The second phase separator may have third and fourth endturn portions and third and fourth leg portions that are integrally formed with and connect the third endturn portion with the fourth endturn portion, wherein the third and fourth leg portions fit within the stator slots and the third and fourth endturn portions each have inner and outer surfaces that are curved to match a geometry of the endturn portions of the second phase winding. The stator assembly may additionally include at least a third phase winding having windings located in a third plurality of stator slots and having endturn portions extending beyond the stator core, wherein the second phase separator electrically insulates the second phase winding form the third phase winding.

The first phase separator may be wider than the second phase separator. The second phase separator may be taller in size than the first phase separator.

The first and second endturn portions of the first phase separator may includes a tabbed portion located opposite the curved outer surface, wherein the tabbed portion defines a plurality of notches and slits for receiving lacing cord.

A method of winding a plurality of phase windings around a stator assembly includes: winding a first phase winding through a first plurality of slots in the stator assembly defined by a plurality of stator teeth extending radially inward from a stator core, the first phase winding having a plurality of endturn portions; locating a plurality of first phase separators adjacent the first phase winding, wherein each of the first phase separators include first and second endturn portions connected by first and second leg portions that extend between the first and second endturn portions and are integral with the endturn portions, each endturn portion including an outer curved surface and an inner curved surface that define a geometry that is aligned with a geometry of the endturn portions of the first phase winding; and winding a second phase winding through a second plurality of slots in the stator assembly defined by the plurality of stator teeth extending radially inward from the stator core, wherein the first phase separator is located between the first phase winding and the second phase winding and provides electrical isolation between the two.

The method may further include locating a plurality of second phase separators adjacent the second phase winding, wherein each of the second phase separators include third and fourth endturn portions connected by third and fourth leg portions that extend between the third and fourth endturn portions and are integral with the endturn portions, each endturn portion including an outer curved surface and an inner curved surface that define a geometry that is aligned with a geometry of endturn portions of the second phase winding.

The method may further include winding a third phase winding through a third plurality of slots in the stator assembly defined by the plurality of stator teeth extending radially inward from the stator core, wherein the second phase separator is located between the second phase winding and the third phase winding and provides electrical isolation between the two.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An insulating phase separator employed in a stator assembly of an electric machine to separate phase windings installed within the stator assembly, the insulating phase separator comprising:

first and second endturn portions, each having a curved outer surface and a tabbed portion located opposite the curved outer surface; and first and second leg portions that extend between the first and second endturn portions and are integral with the first and second endturn portions.

2. The insulating phase separator of claim 1, wherein the curved outer surface of the first and second endturn portions are selected based on a geometry of the phase winding endturns located adjacent to the first and second endturn portions.

3. The insulating phase separator of claim 1, wherein the tabbed portion located opposite the curved outer surface includes a plurality of notches and slits located between each tab for receiving lacing cord.

4. The insulating phase separator of claim 1, wherein the first and second endturn portions further include a curved inner surface located between the first and second leg portions, wherein the geometry of the curved inner surface is selected based on the geometry of the phase winding endturns located adjacent to the first and second endturn portions.

5. A stator assembly for an electric machine, the stator assembly comprising:

a stator core having a plurality of stator teeth extending radially inward from the stator core, the plurality of stator teeth defining a plurality of stator slots for receiving phase windings;

a first phase winding having windings located in a first plurality of the stator slots and having endturn portions extending beyond the stator core;

a first phase separator located adjacent the first phase winding, the first phase separator having first and second endturn portions and first and second leg portions integrally formed with and connecting the first endturn portion with the second endturn portion, wherein the first and second leg portions fit within the stator slots and the first and second endturn portions each have inner and outer surfaces that are curved to match a geometry of the endturn portions of the first phase winding, each of the first and second endturn portions including a tabbed portion located opposite the curved outer surface; and a second phase winding having windings located in a second plurality of stator slots and having endturn portions extending beyond the stator core, wherein the first phase separator electrically insulates the first phase winding form the second phase winding.

6. The stator assembly of claim 5, further including:

a second phase separator located adjacent the second phase winding, the second phase separator having third and fourth endturn portions and third and fourth leg portions that are integrally formed with and connect the third endturn portion with the fourth endturn portion, wherein the third and fourth leg portions fit within the stator slots and the third and fourth endturn portions each have inner and outer surfaces that are curved to match a geometry of the endturn portions of the second phase winding; and a third phase winding having windings located in a third plurality of stator slots and having endturn portions extending beyond the stator core, wherein the second phase separator electrically insulates the second phase winding form the third phase winding.

7. The stator assembly of claim 6, wherein the first phase separator is wider than the second phase separator and the second phase separator is taller than the first phase separator.

8. The stator assembly of claim 5, wherein the tabbed portion of each of the first and second endturn portions of the first phase separator includes a plurality of slots for receiving lacing cord.

9. A method of winding a plurality of phase windings around a stator assembly, the method comprising:
- winding a first phase winding through a first plurality of slots in the stator assembly defined by a plurality of stator teeth extending radially inward from a stator core, the first phase winding having a plurality of endturn portions;
- locating a plurality of first phase separators adjacent the first phase winding, wherein each of the first phase separators include first and second endturn portions connected by first and second leg portions that extend between the first and second endturn portions and are integral with the endturn portions, each endturn portion including an outer curved surface and an inner curved surface that defines a geometry that is aligned with a geometry of the endturn portions of the first phase winding, each of the first and second endturn portions including a tabbed portion located opposite the outer curved surface;
- winding a second phase winding through a second plurality of slots in the stator assembly defined by the plurality of stator teeth extending radially inward from the stator core, wherein the first phase separators are located between and provide electrical isolation between the first phase winding and the second phase winding.

10. The method of claim 9, further comprising:
- locating a plurality of second phase separators adjacent the second phase winding, wherein each of the second phase separators include third and fourth endturn portions connected by third and fourth leg portions that extend between the third and fourth endturn portions and are integral with the endturn portions, each endturn portion including an outer curved surface and an inner curved surface that defines a geometry that is aligned with a geometry of endturn portions of the second phase winding.

11. The method of claim 10, further comprising:
- winding a third phase winding through a third plurality of slots in the stator assembly defined by the plurality of stator teeth extending radially inward from the stator core, wherein the second phase separators are located between and provide electrical isolation between the second phase winding and the third phase winding.

* * * * *